United States Patent [19]

Caray

[11] 4,433,771
[45] Feb. 28, 1984

[54] TORSION DAMPING DEVICE FOR A CLUTCH PLATE

[75] Inventor: Andre Caray, Paris, France
[73] Assignee: Valeo S.A., Paris, France
[21] Appl. No.: 283,284
[22] Filed: Jul. 14, 1981

[30] Foreign Application Priority Data

Jul. 15, 1980 [FR] France ............................... 80 15598

[51] Int. Cl.³ ............................................. F16D 3/66
[52] U.S. Cl. ............................ 192/106.2; 192/106.1; 192/70.17; 464/63
[58] Field of Search ................... 192/55, 106.1, 106.2, 192/70.17; 464/63, 67, 68

[56] References Cited

U.S. PATENT DOCUMENTS

| 3,101,600 | 8/1963 | Stromberg | 464/63 |
| 3,414,101 | 12/1968 | Binder et al. | 192/106.2 |
| 3,556,273 | 1/1971 | Maucher | 192/106.2 |
| 3,800,931 | 4/1974 | Maucher | 192/106.2 |
| 4,177,888 | 12/1979 | Arrowsmith | 192/106.2 |
| 4,347,717 | 12/1979 | Lamarche | 192/106.2 |

FOREIGN PATENT DOCUMENTS 2260026 1/1974 France ............................... 192/106.2

Primary Examiner—Rodney H. Bonck
Assistant Examiner—James J. Merek
Attorney, Agent, or Firm—Charles E. Brown

[57] ABSTRACT

The invention provides a two-stage torsion-damping hub for a clutch plate. The elastic members of the first damping stage are located between two guide elements which are rotatably integral with one of the coaxial parts forming the second damping stage. According to the invention, each guide element of the first damping stage comprises a plurality of individual guide plates, each of which is associated with an elastic member, and each guide plate extends circumferentially on both sides of the respective elastic member and at least partially covers said elastic member.

15 Claims, 33 Drawing Figures

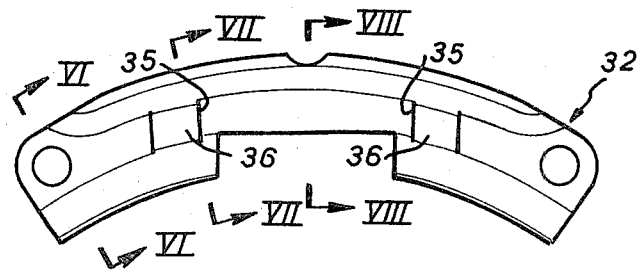
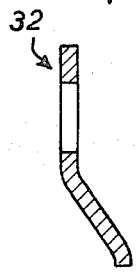
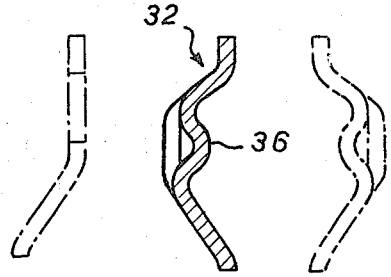
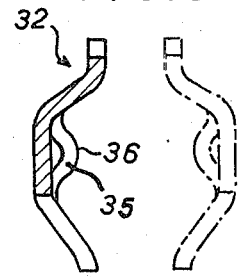
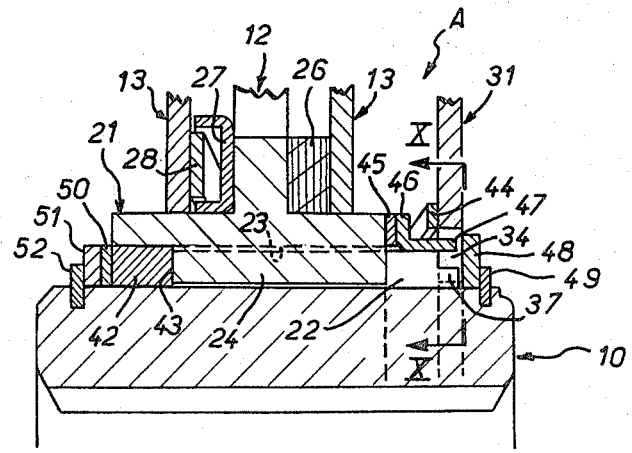
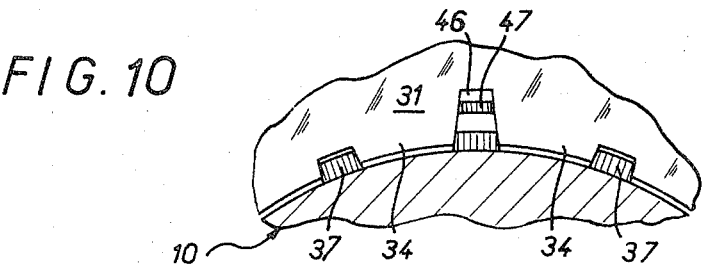

TORSION DAMPING DEVICE FOR A CLUTCH PLATE

BACKGROUND OF THE INVENTION

The present invention relates, in general terms, to torsion-damping devices of the kind conventionally used in a clutch plate assembly, especially for a motor vehicle, to minimise the vibrations which are liable to arise along the kinematic chain in which the assembly is located, and thereby to ensure a controlled transmission of the torque applied to the clutch.

The present invention is aimed, more particularly, at torsion-damping devices of this kind which comprise two separate damping stages, namely a first stage of relatively lower rigidity and a second stage of relatively greater rigidity, which are arranged axially next to one another on a common hub and each of which have two coaxial parts mounted to rotate relative to one another against the action of elastic members interposed circumferentially between them.

Such a torsion-damping device is described, for example in French Pat. Nos. 1,501,465 and 2,376,333.

In French Pat. No. 2,376,333 the first damping stage comprises, transversely, two annular flanges located substantially in the same plane one around the other, the elastic members interposed circumferentially between these two flanges bearing, at one end on one of these flanges and at the other end on the other flange.

The advantage of this arrangement is that it results in a minimum axial bulk.

However, it has several disadvantages.

First of all, the two flanges used are not identical and therefore each need to be manufactured separately.

Furthermore, being spaced out radially, they result overall in a considerable radial bulk which can rule out certain applications.

Moreover, since the elastic members interposed circumferentially between these flanges bear at each of their ends on a single element only, which consists of one or other of these flanges, the stability, parallel to the axis of the assembly, of these elastic members is not properly controlled, and during operation these elastic members may move laterally, parallel to the axis of the assembly, to the detriment of their working condition.

Finally, the specific arrangement one around the other of the two flanges necessarily implies a paired association of elastic members, the two elastic members of one and the same pair being mounted in opposition to one another, one being compressed when the other expands, and vice versa, so that the torque resulting overall from the assembly of these elastic members is, for a given bulk, necessarily less than that switch is normally possible by means of elastic members all acting in the same direction.

In practice, these elastic members are necessarily very flexible, and they are therefore particularly sensitive during operation, to the effects of centrifugal forces, again to the detriment of their stability.

In French Pat. No. 1,501,465, one of the coaxial parts of the first damping stage comprises, transversely, a flange rotating integrally with the hub of the assembly, whilst the other comprises transversely, on either side of said hub flange, two elements referred to as guide elements, which are integral with one aonther and with one of the coaxial parts of the second damping stage, the other of the coaxial parts of the second damping stage engaging said hub flange with play.

In practice, in this French Pat. No. 1,501,465, the two guide elements used in this way, which are provided to ensure improved location during operation of the corresponding elastic members, both consist of two annular washers which extend circularly in a continuous manner around the hub of the assembly.

The result of this is a considerable outlay of metal and, axially, a large overall bulk of the assembly.

This is all the more so because, by virtue of the construction, the elastic members of the first damping stage are arranged either on a circumference of the assembly having a diameter substantially equal to that on which the elastic members of the second damping stage are located elsewhere, or on a circumference having a diameter less than that of the latter circumference, in this case, in line with the fixing means used elsewhere to effect the assembly of the various parts constituting one of the coaxial parts of this second damping stage.

Finally, in this French Pat. No. 1,501,465, the guide washers of the first damping stage each have, in known manner, in a position corresponding to each of the elastic members in question, an aperture in which an elastic member is partially axially engaged, in such a way that, although these guide washers assist in locating these elastic members, this location is not completely guaranteed.

The object of the present invention is, in general terms, to provide an arrangement which makes it possible to avoid the disadvantages briefly described above and which also leads to other advantages.

SUMMARY

The present invention provides a torsion-damping device for a clutch plate assembly, of the kind comprising two separate damping stages, namely a first stage of relatively lower rigidity and a second stage of relatively greater rigidity, which are arranged axially next to one another around a common hub and each of which have two coaxial parts mounted for relative rotation against elastic members interposed circumferentially between them, one of the coaxial parts of said first damping stage comprising, transversely, a flange rotating integrally with said hub, whilst the other comprises, transversely, on either side of said flange, two guide elements which are integral with one another and with one of the coaxial parts of the second damping stage, the other of the coaxial parts of said second damping stage engaging, with play, said hub, whereby each of the guide elements of said first damping stage is reduced to a plurality of separate guide plates, one for each elastic member, and each of said guide plates extend circumferentially on either side of the elastic member with which it is associated, at least partially covering the latter.

Thus, the operational stability of these elastic members is ensured, whilst the plates constituting the guide elements according to the invention involve only a minimum outlay of metal.

Moreover, the axial bulk of the assembly can advantageously be reduced as much as possible, in which case the plates constituting that of the guide elements of the first damping stage which is integral with one of the coaxial parts of the second damping stage are preferably laid flat directly against said coaxial part of this second damping stage.

The axial bulk of the assembly is reduced all the more if, according to one of the characteristic arrangements of the invention, the elastic members of the first damping stage are arranged on a circumference of the assembly having a diameter greater than that of the circumference on which the elastic members of the second damping stage are arranged elsewhere, in a region of the assembly where, on the one hand, the conditions of axial dimensions are relatively less demanding, and/or, on the other hand, the elastic members of the two damping stages can radially overlap relative to one another.

Apart from the reduction in the axial bulk of the assembly which this arrangement makes possible, it also makes it easier to install the assembly in the clutch of which it is a component part, the elastic members of the first damping stage no longer hampering the axial advance effected by the fingers of the diaphragm which such a clutch conventionally possesses, during the passage of the latter from its engaged position to its disengaged position, as is the case when such elastic members are installed on a circumference having a diameter less than that of the circumference on which the elastic members of the second damping stage are also arranged.

The arrangement according to the invention of the elastic members of the first damping stage on a circumference of the assembly having a diameter greater than that of the preceding circumference consequently favours easy adaptability of the assembly to different specific production conditions, while adhering to the installation restrictions which these conditions must observe.

Finally, the invention makes it possible to use, without modification, for the production of the respective torsion-damping device with two damping stages, tools conventionally used hitherto for producing this torsion-damping device having only a single damping stage, this advantageously favouring a rationalisation of the corresponding manufacturing processes and, consequently, achieving a lower cost.

BRIEF DESCRIPTION OF THE DRAWINGS

FIG. 5 is, on a larger scale, a partial elevation view of one of the plates used to constitute a guide element;

FIGS. 6, 7 and 8 are transverse views of this plate, in an axial cross-section, respectively along the lines VI—VI, VII—VII and VIII—VIII of FIG. 5;

FIG. 9 repeats, on a larger scale, the detail of FIG. 2 marked by an inset IX on this FIG. 2;

FIG. 10 is a partial view of the assembly in a cross-section, along the line X—X of FIG. 9;

DETAILED DESCRIPTION OF THE PREFERRED EMBODIMENTS

Figure 1:
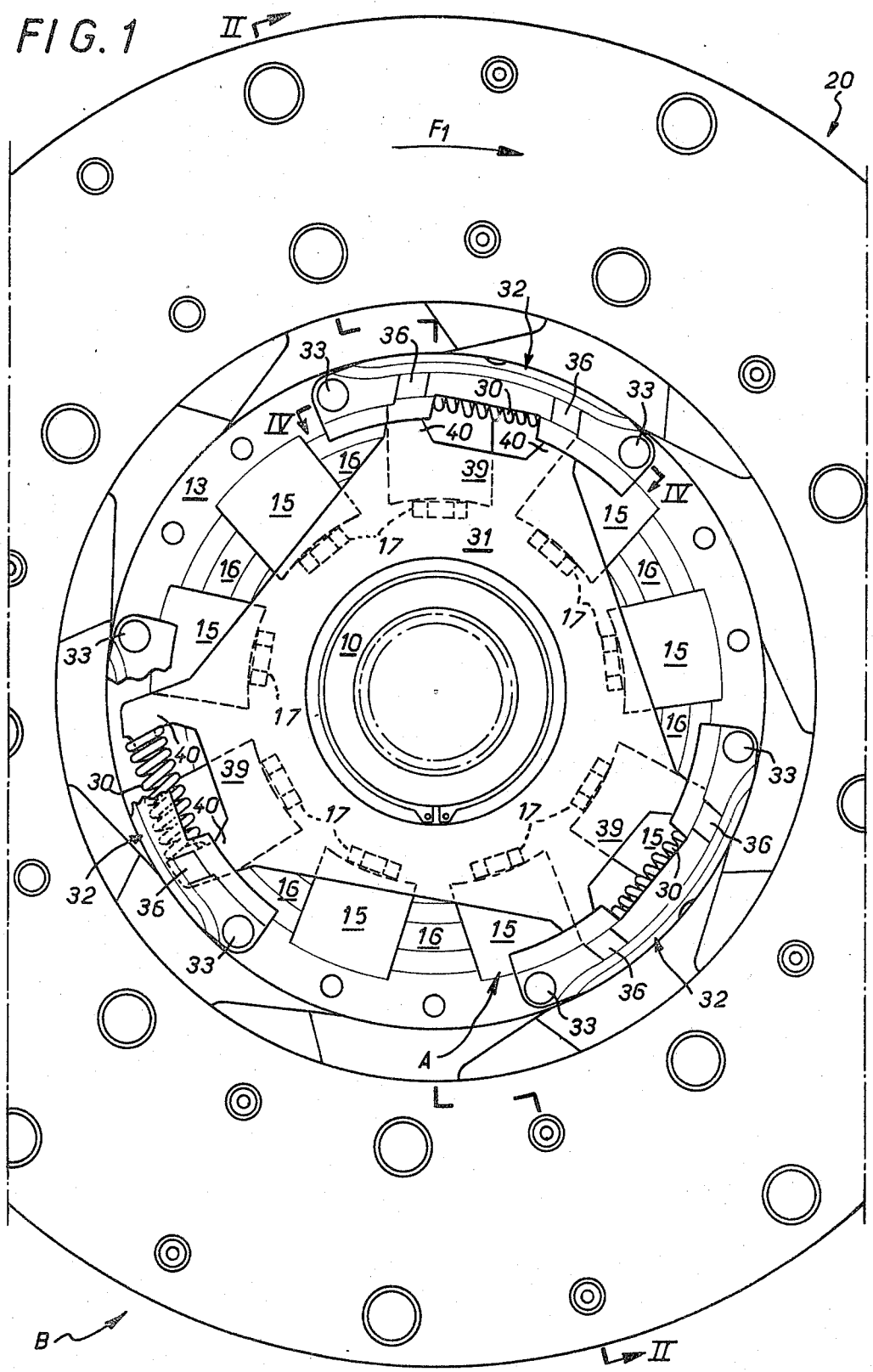
FIG. 1 is a partial plan view of a torsion-damping device according to the invention, looking in the direction of arrow I of FIG. 2.
Figure 2:
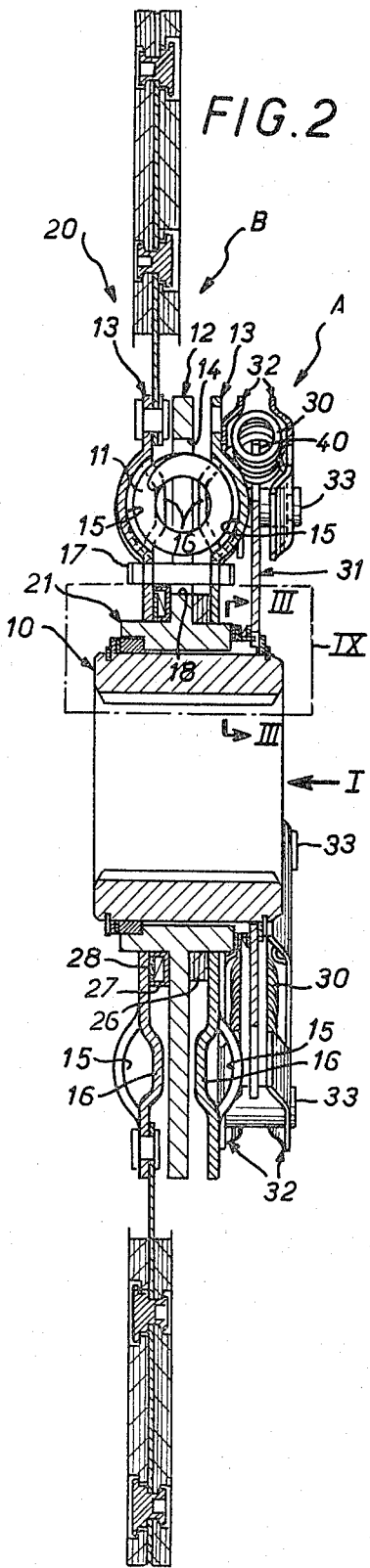
FIG. 2 is a view of this in an axial cross-section along the interrupted line II—II of FIG. 1.

In general terms, and as illustrated in these figures, the torsion-damping device according to the invention comprises two separate damping stages, namely a first stage A of relatively lower rigidity and a second stage B of relatively greater rigidity, arranged axially next to one another around a common hub 10.

In known manner, the second damping stage B comprises two coaxial parts mounted to rotate relative to one another against the action of elastic members 11 interposed circumferentially between them, the two coaxial parts comprising, transversely, a hub disc 12 and on either side of the hub disc 12, two guide washers 13.

The elastic members 11, which consist of simple springs in the embodiment shown, are each arranged respectively in seatings which are formed partly by an aperture 14 made for this purpose in the hub disc 12 and partly by pressings 15 made for this purpose in the guide washers 13, opposite the aperture 14 of the hub disc 12, pressings 16, which are likewise made in the guide washers 13 alternately with the pressings 15, provide a circumferential support for these springs at the ends of the latter.

The guide washers 13 are made integral with one another by means of spacers 17 which, extending from one of these guide washers 13 to the other, pass axially through the hub disc 12 by way of radial extensions 18 of the apertures 14 in said hub disc.

So far as a clutch plate assembly, particularly for a motor vehicle, is concerned, one of the guide washers 13 carries a friction disc 20 on its outer periphery, whilst the hub disc 12 is carried by a hub 21 (or second hub) which is engaged coaxially around the hub 10 (or first hub) common to the two damping stages A, B, and which engages, with play, with the latter via a splined mounting.

Figure 3:
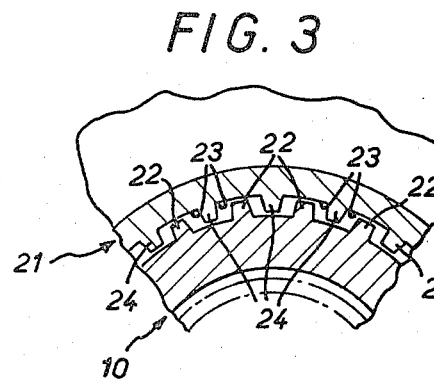
FIG. 3 is a partial view of this in a cross-section along the line III—III of FIG. 2.

For example, as illustrated in FIG. 3, the hub 10 has on its outer periphery projecting splines 22 each engaged radially, with circumferential play on either side, in a groove 23 made for this purpose on the inner periphery of the hub 21, between two splines 24.

The second damping stage B also has friction means which act between its two component parts and with which axially acting elastic means are associated.

In known manner, in the embodiment illustrated in FIGS. 1 to 10, these consist of a friction washer 26 which is interposed between one of the guide washers 13 and the hub disc 12, whilst an axially acting elastic washer 28, for example of the "ONDUFLEX" type, as illustrated, is interposed, via a distribution washer 27, between the other guide washer 13 and the hub disc 12.

These arrangements are well known in themselves and, since they are not part of the present invention, will not be described in more detail here.

Like the second damping stage B, the first damping stage A has two coaxial parts mounted to rotate relative to one another against elastic members 30 interposed circumferentially between them, namely a first part comprising, transversely, a flange 31 integral with the hub 10 common to the assembly of the two damping stages A, B, and a second part comprising, transversely, on either side of the flange 31, two guide elements, which are integral with one another and integral with one of the coaxial parts of the second damping stage B.

According to the invention, each of these guide elements of the first damping stage A is confined to a plurality of separate guide plates 32, one for each elastic member 30, each of these guide plates 32 extending circumferentially on either side of the elastic member 30 with which it is associated, and at least partially covering the latter.

In other words, the guide plates 32 according to the invention are associated in pairs on either side of each elastic member 30.

At their circumferential ends, the two guide plates 32 associated in this way with one and the same elastic member 30 are jointly connected by fixing means to the respective coaxial part of the second damping stage B.

In the embodiment illustrated, these comprise spacer columns 33 which, extending axially, maintain a definite distance between the guide plates 32 in question and fix the latter to one of the guide washers 13 of the second damping stage B, these columns 33 being riveted at their ends, on the one hand, to the respective guide washer 13 and, on the other hand, to the guide plate 32 furthest removed from these.

As will be noted, the guide plate 32 which is immediately adjacent the guide washer 13 in question is held flat against the latter by means of the columns 33.

In its central region, each guide plate 32 possesses radially, in order to ensure a circumferential support for the elastic member 30 which it covers, at the ends of this elastic member, two shoulders 35 and, in the embodiment illustrated, these shoulders 35 are formed by a pressed-out edge 36 which such a guide plate 32 has projecting from it for this purpose, in the direction of the similar guide plate 32 with which it is associated.

As will be noted, the columns 33 forming the means for fixing the guide plates 32 associated with one and the same elastic member 30, on the one hand, and the shoulders 35 which these guide plates 32 possess to ensure a circumferential support for the respective elastic member 30, on the other hand, are arranged substantially on one and the same circumference of the assembly, which results in excellent stability of these guide plates 32.

As will also be noted, the guide plates 32 are advantageously identical and, in the embodiment illustrated, they are bent substantially at the level of the outer periphery of the guide washer 13 to which they are connected.

The flange 31 of the first damping stage A possesses, on its inner periphery, teeth 34 by means of which it is engaged on axial extensions 37 of the splines 22 of the hub 10, so that it rotates integrally with the latter, as shown in detail in FIGS. 9 and 10.

Figure 4:
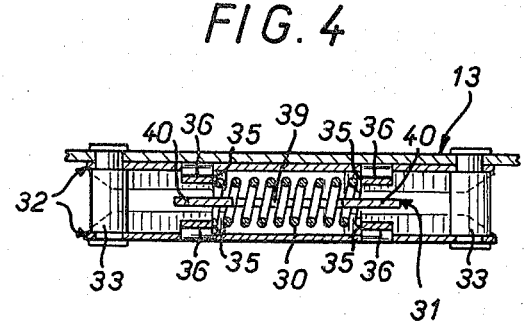
FIG. 4 is a partial view of this in a circumferential cross-section, assumed to be unfolded flat, along the line IV—IV of FIG. 1.

On its outer periphery, it possesses as many arms 39 as there are elastic members 30, as shown in FIG. 1, and each of its arms 39 terminates in two fingers 40 by means of which, according to FIG. 4, it engages in a fork-like manner on the corresponding elastic member 30, between the guide plates 32 surrounding the latter.

As before, these elastic members 30 consist of simple springs.

As will be noted, these elastic members 30 are arranged on a circumference of the assembly having a diameter greater than that of the circumference on which the elastic members 11 of the second damping stage B are located elsewhere, and they overlap radially with the latter, the elastic members 30 encroaching upon the volume delimited overall by the two transverse planes tangential to the elastic members 11.

As will also be noted, since the guide washers 13 are identical, the holes provided on one of these for fixing the friction disc 20 are put to use on the other for installing the columns 33 which fix the guide plates 32.

Centring means are provided between the hub 21 of the damping stage B and the hub 10 common to the two damping stages A, B.

In the embodiment illustrated in FIGS. 1 to 10, this is a centring ring 42 interposed between said hubs at one of the axial ends of the hubs; as regards the hub 10, this centring ring interacts with the outer periphery of this hub and, as regards the hub 21, with the inner periphery of the latter.

In the embodiment illustrated by FIGS. 1 to 10, such centring means are provided only at one of the ends of the hubs 10 and 21.

However, jointly, to maintain a suitable alignmnt with the hub 10, the hub 21 has transversely a shoulder 43 by means of which it is held in contact with the centring ring 42 under the stress of axially acting elastic means, as shown in FIG. 9.

In practice, in the embodiment illustrated, the latter consist of an axially acting elastic washer 44, for example of the "ONDUFLEX" type, which bearing on the flange 31 of the first damping stage A, forms jointly the axially acting elastic means associated with the friction means of this first damping stage, and which therefore acts on the edge of the hub 21 by means of a friction washer 45 attached, for example by gluing, to a distribution washer 46 itself blocked against rotation relative to the flange 31; for example, and as shown in the embodiment illustrated by FIGS. 1 to 10, this distribution washer 46 is blocked on the flange 31 by at least one lug 47 engaged between two teeth 34 of the inner periphery of this flange 31, the corresponding notch having been extended radially for this purpose, as will be seen from FIGS. 9 and 10.

Jointly, by means of a distributing washer 48, the flange 31 bears axially against a split ring 49 engaged with the hub 10 and, at the other end of the latter, by means of a friction washer 50 and a distribution washer 51, the centring ring 42 itself bears axially against a split ring 52 engaged with this hub 10.

Figure 11:
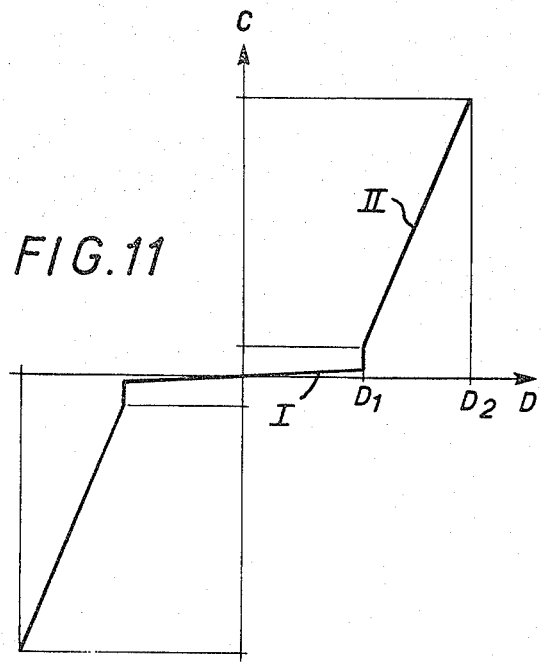
FIG. 11 is a diagram illustrating the functioning of the torsion-damping device according to the invention.

In the diagram of FIG. 11, the angular movement D between the friction disc 20 and the hub 10 has been plotted on the abscissa and the torque C transmitted between this friction disc 20 and this hub 10 has been plotted on the ordinate, for the case when the friction disc 20 is engaged with a drive shaft, whilst the hub 10 is blocked against rotation on a driven shaft.

In a first instance, and on the assumption that, for example, the direction of rotation of the assembly for traction operation is that marked by the arrow F1 in FIG. 1, only the elastic members 30 of the first damping stage A are involved, the elastic members 11 of the second damping stage B having a much greater rigidity and also, in the embodiment illustrated, being slightly prestressed in the position of rest of the assembly.

Allowing, therefore, for the rigidity of the elastic members 11, the friction disc 20, the guide washers 13 and the hub disc 12 moves as a single unit relative to the hub 10 during this first phase of operation and carry along with them the guide plates 32 of the first damping stage A.

By means of the elastic members 30, these guide plates subject the flange 31 to rotation and, consequently, the hub 10 on which the latter is blocked against rotation.

The curve representing the operation of the assembly is therefore a straight line I having a slope proportional only to the rigidity of the springs constituting the elastic members 30.

This first phase of operation proceeds until, as regards the movement D1, the circumferential play between the splines 22 and 24 of the hubs 10 and 21 is completely absorbed.

After the absorption of their prestress, the springs constituting the elastic members 11 of the second damping stage B are activated in turn, and this second phase of operation, the representative curve of which is a straight line II having a slope proportional to the cumulative rigidity of the springs 11 and 30, proceeds until, as regards the movement D2, the springs 11 are saturated or when a positive drive takes place between the friction disc 20 and the hub 10.

A process similar to the preceding one takes place for an operation of the assembly on the over-run.

For the sake of greater clarity of the diagram of FIG. 11, this has not allowed for the "hysteresis" effect which is due to the friction means and which develops during such a process, that is to say, the differentiation occurring, for one and the same value of movement, as a result of this friction between, on the one hand, the torque value for an increasing trend of this torque and the torque value for a decreasing trend.

Figure 12:
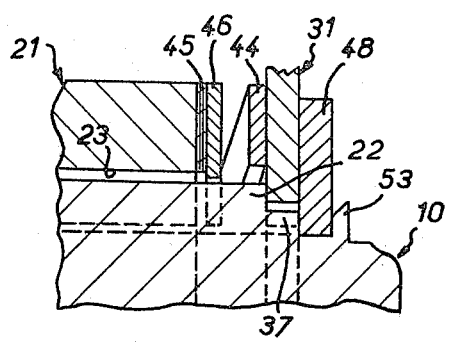
FIG. 12 is a view partly repeating a detail of FIG. 9 and relates to an alternative embodiment.

In the alternative embodiment illustrated in FIG. 12, the distribution washer 46 is blocked directly on the hub 10, its inner periphery having a toothing by means of which it is engaged on at least one of the splines 22 of this hub 10; moreover, in this alternative embodiment, the axial retention of the flange 31 is ensured by a rim 53 which, originating from the hub 10, is forced back in contact with the distribution spring 48, by means of crimping.

Figure 13:
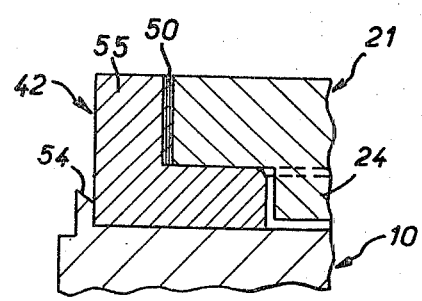
FIG. 13 is a view partly repeating another detail of FIG. 9 and relates to another alternative embodiment.

Likewise, in the alternative embodiment illustrated in FIG. 13, the axial retention of the centering ring 42 is ensured by a crimping rim 54; moreover, in this alternative embodiment, the centering ring 42 possesses radially a collar 55 for maintaining the hub 21 in alignment, this hub 21 bearing via its edge against this collar 55 by means of the friction washer 50.

Figure 14:
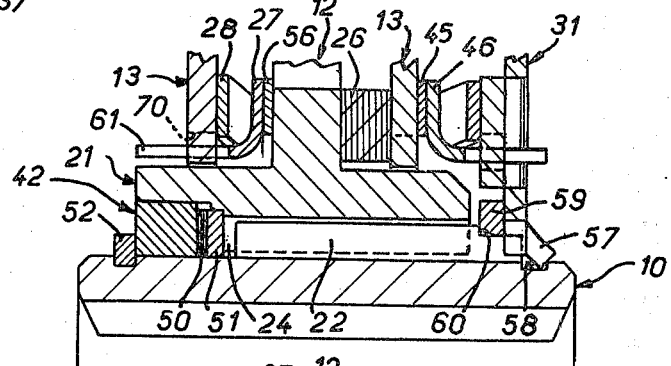
FIGS. 14 to 33 are views similar to that of FIG. 9 and each relate respectively to an alternative embodiment.

In the alternative embodiment illustrated in FIG. 14, the centering ring 42 is directly in contact with the split ring 52 which ensures that it is held axially, the friction washer 50 and the distribution washer 51 associated therewith being interposed between this centering ring 42 and the edge of the splines 24 of the hub 21; moreover, in this alternative embodiment, the axial retention of the flange 31 is ensured by tabs 57 formed on the inner periphery of this flange and deformed axially in an oblique manner, said tabs 57 snapping elastically in a channel 58 of the hub 10 when the flange 31 is put in place; furthermore, in this alternative embodiment, the flange 31 bears axially against a ring 59 which, engaged against a shoulder 60 of the splines 22 of the hub 10, acts as a distribution washer; moreover, in this alternative embodiment, the friction means of both of the damping stages A, B, intervene on circumferences of the assembly having substantially equal diameters, the friction washer 45 being located level with the friction washer 26; finally, in this alternative embodiment, the bearing washer 27 of the second damping stage also carries a friction washer 56, and, by means of at least one axial lug 61, it is blocked against rotation on the corresponding guide washer 13, the latter having a notch 70 on its inner periphery for this purpose.

Figure 15:
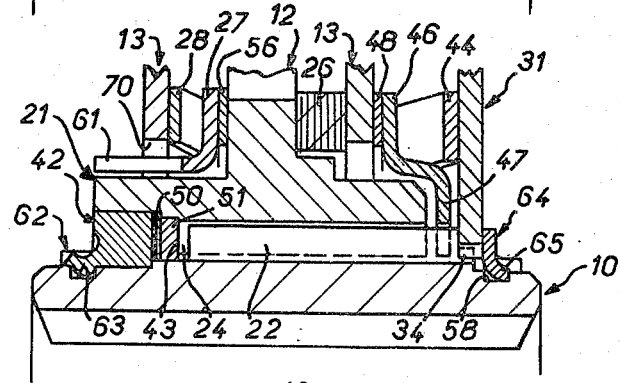

In the alternative embodiment illustrated in FIG. 15, the axial retention of the centering ring 42 is ensured by a collar 62 which prolongs this centering ring 42 axially in the vicinity of the hub 10, this collar 62 being forced back locally at various points by crimping into a channel 63 of thus hub 10; moreover, in this alternative embodiment, the axial holding of the flange 31 is ensured by a ring which has a square transverse profile 64, this ring 64 having locally, on its inner periphery, lugs 65 by means of which it is snapped into the channel 58 of the hub 10; finally, in this alternative embodiment, the bearing washer 46 associated with the friction means of the first damping stage A is directly blocked against rotation on the hub 10, this washer 46 having for this purpose on its inner periphery a toothing by means of which it is engaged on the splines 22 of hub 10.

Figure 16:
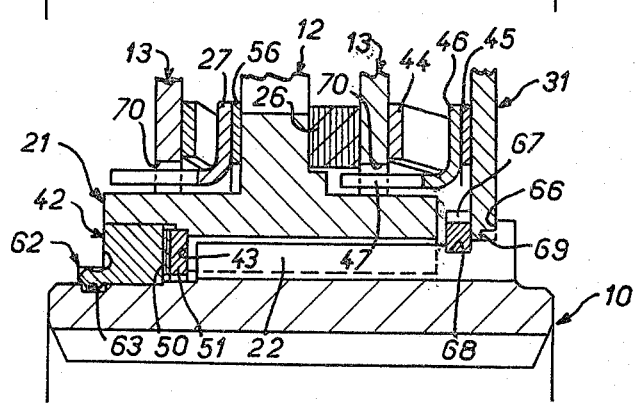

In the alternative embodiment illustrated in FIG. 16, the flange 31 is maintained in axial contact against a transverse shoulder 66 of the splines 22 of the hub 10 by means of a ring 67 forced back radially at various points into a channel 68 of these splines 22, this flange 31 being engaged on its inner periphery with radial extensions 69 of said splines, so that it rotates integrally with the hub 10; moreover, in this alternative embodiment, the friction washer 45 of the first damping stage A is in contact with the flange 31, the bearing washer 46 holding it being blocked against rotation, by means of its axial lug 47, on the corresponding guide washer 13, as a result of engagement in a notch 70 of the latter.

Figure 17:
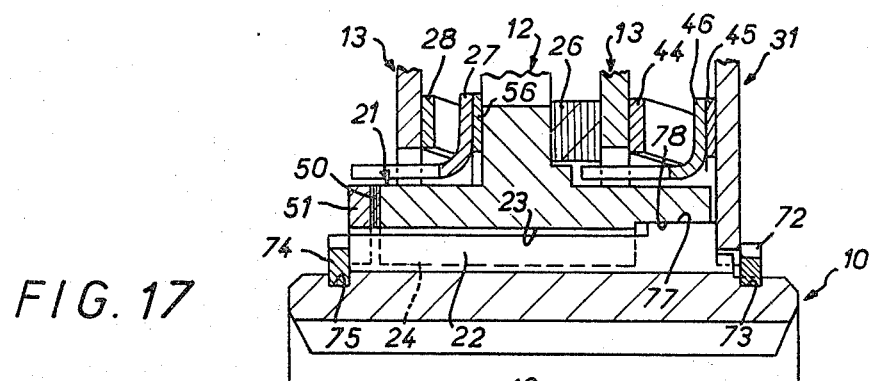

In the alternative embodiment illustrated in FIG. 17, the axial retention of the flange 31 is ensured by a washer 72 forced back radially at various points into a channel 73 of the hub 10, this flange 31 bearing, moreover, against the edge of the splines 22, as in the embodiment illustrated in FIGS. 1 to 10; furthermore, the axial retention of the hub 21 is itself ensured by a washer 74 forced back radially at various points into a channel 75 of the hub 10, with the friction washer 50 and the distribution washer 51 interposed against the edge of the hub 21, said distribution washer engaging, by means of a toothing formed on its inner periphery, with the splines 22 of the hub 10; finally, in this alternative embodiment, the centering means provided between the hub 10 and the hub 21 comprise two complementary cylindrical bearings 77, 78 each formed respectively on said hubs, beyond their splines 22, 24, at the axial end of these hubs at which the flange 31 is located, substantially level with the bottom of the grooves 23 of the hub 21.

It must be emphasised that, as before, there is a radial play between, on the one hand, the splines 22 of the hub 10 and, on the other hand, the bottom of the grooves 23 of the hub 21.

Figure 18:
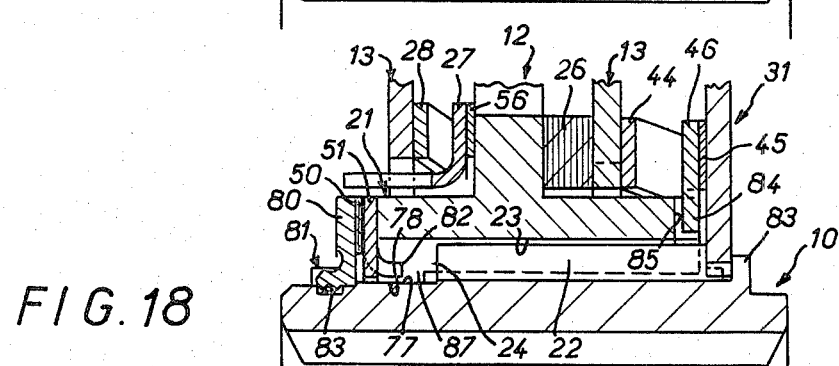

In the alternative embodiment illustrated in FIG. 18, the cylindrical centering bearings 77, 78 of the hubs 10, 21 are formed at the other end of the latter, substantially level with the bottom of the grooves separating two by two the splines 22 of the hub 10; moreover, in this alternative embodiment, the axial retention of the hub 21 is ensured by a ring 80 which has an axial collar 81 forced back radially at various points into the channel 83 of the hub 10, and the distribution washer 51 interposed with the friction washer 50 between this ring 80 and the hub 21 has, on its inner periphery, lugs 82 which are engaged axially, to ensure that it is integral with the hub 10, between axial extensions 87 of the splines 24 of said hub, by means of which splines the cylindrical bearing 78 is formed; furthermore, in this embodiment, the flange 31 bears axially directly against a rim 83 originating from the hub 10 as a result of a crimping operation, and the bearing washer 46 carrying the friction washer 45 of the first damping stage A has, on its inner periphery, at least one radial lug 84 by means of which it is engaged in a notch 85 of the hub 21, to make it rotate integrally with the latter.

Figure 19:
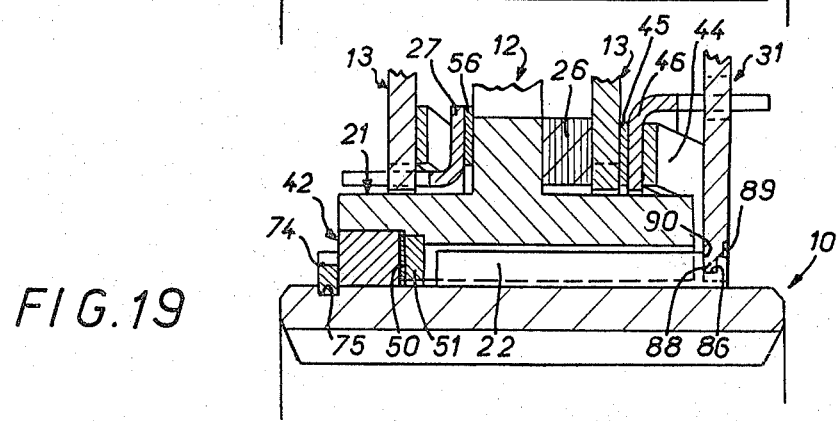

In the alternative embodiment illustrated in FIG. 19, the splines 22 of the hub 10 have, at right angles to the flange 31, a channel 86, and, on its inner periphery, this flange 31 has from place to place, to ensure that it is held axially, radial extensions 88 which, engaged radially in the channel 86 of the hub 10, each originate respectively from indentations 89 made axially on the flange 31, on the face of the latter opposite the shoulder 90 of the splines 22 of this hub 10 against which it bears.

Figure 20:
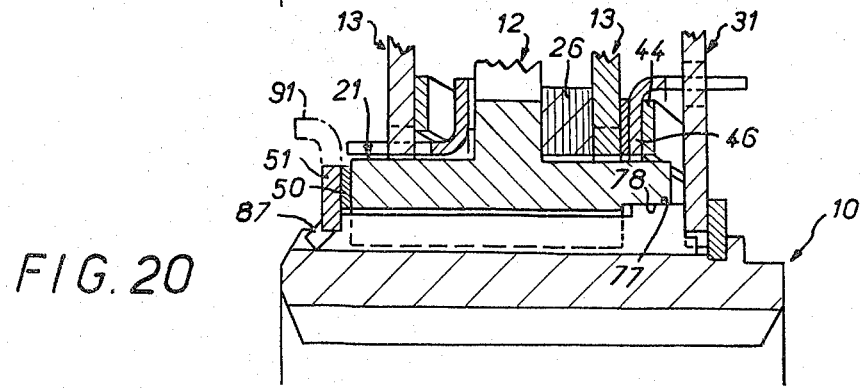

In the alternative embodiment illustrated in FIG. 20, the axial retention of the hub 21 is ensured directly by the distribution washer 51 carrying the friction washer 50, this distribution washer 51 having on its inner periphery lugs 87 which, folded obliquely, are engaged elastically on the hub 10 and thus anchored, as a result of their elasticity, in the latter; if necessary, and as indicated by broken lines, this washer 51 has on its outer periphery an axial collar 91 to stiffen it.

In the foregoing, centering means are provided between the hubs 10 and 21 only at one of the axial ends of these.

Alternatively, such centering means can be provided at the two axial ends of these hubs.

Figure 21:
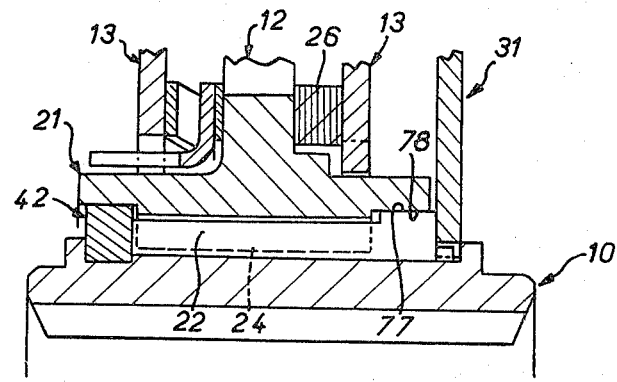

For example, in FIG. 21, a centering ring 42 of the type described above can be provided at one of the axial ends of the hubs 10 and 21, whilst cylindrical centering bearings 77, 78 of the type also described above are formed at the other end of these hubs.

Alternatively, two centering rings can be provided.

Figure 22:
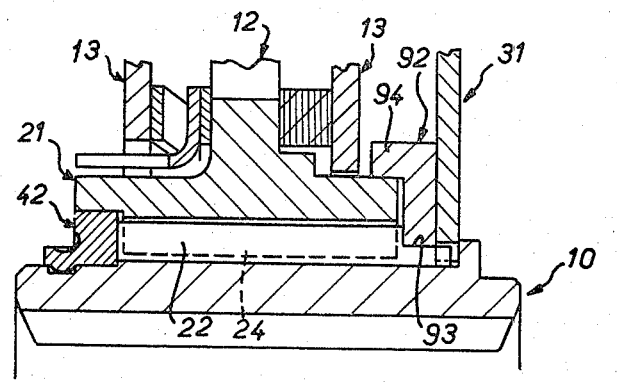

For example, in FIG. 22, a centering ring 42 of the type described above, which interacts with the outer periphery of the hub 10 and the inner periphery of the hub 21, can be arranged at one of the axial ends of these hubs, whilst arranged at the other axial end of these is a centering ring 92 which interacts by means of its inner periphery with a cylindrical bearing 93 of the hub 10 formed at the end of the splines 22 and which, by means of an axial return 94, interacts with the outer periphery of the hub 21.

Figure 23:
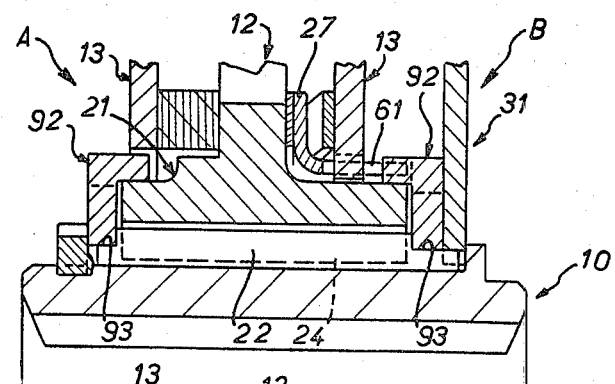

In the alternative embodiment illustrated in FIG. 23, the two centering rings used are centering rings 92.

Moreover, in this embodiment, the axial lug 61 of the bearing washer 27 associated with the friction means of the second damping stage B has an extension which, after passing through the guide washer 13 and being blocked against rotation on the latter, is sufficient for it to engage, with play, with the corresponding centering ring 92, the latter having for this purpose a notch suitable for the engagement of an axial lug 61.

Figure 24:
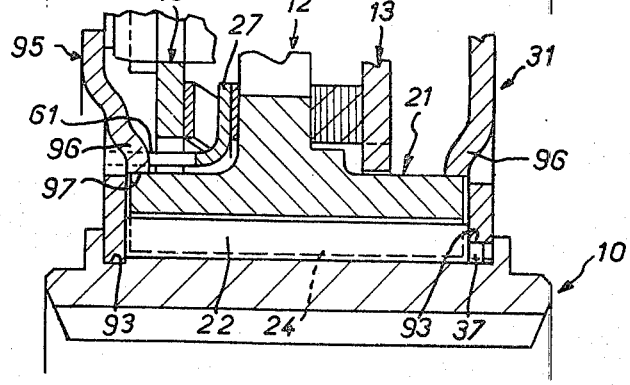

In the embodiment illustrated in FIG. 24, one of the centering rings used is formed by a washer 95, of which the edge of the inner periphery is in contact with a cylindrical bearing 93 of the hub 10 and which has, from place to place, projecting axially via slits, lugs 96 forming jointly a cylindrical bearing 97 by means of which it is engaged on the hub 21; the flange 31 itself forms a centering ring of this type, the flange 31 being in contact, on its inner periphery, with a cylindrical bearing 93 of the hub 10, made, in practice, on axial extensions 37 of the splines 22 of said hub and having from place to place lugs 96 in contact with the outer periphery of the hub 21.

As before, in this embodiment, the axial lug 61 of the bearing washer 27 has axially an extension which is sufficient to engage with the centering ring 95, after passing through the corresponding guide washer 13.

Figure 25:
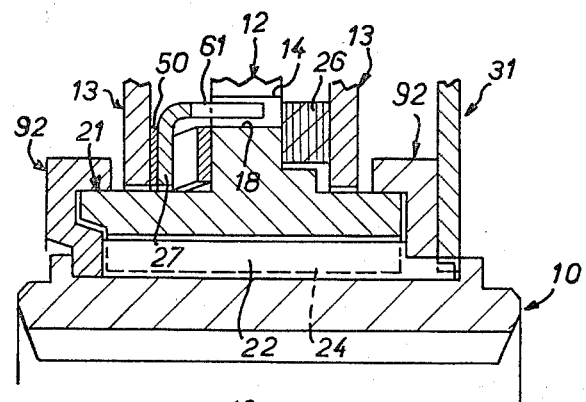

Alternatively, in FIG. 25, it is engaged in a notch 18 forming a radial extension of one of the apertures 14 of the hub disc 12.

Figure 26:
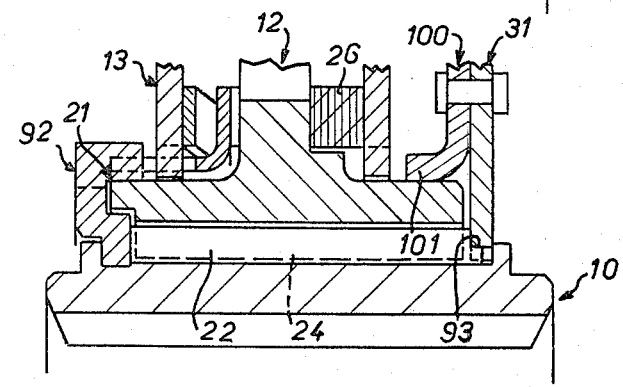

In the embodiment illustrated in FIG. 26, one of the centering rings used is formed by a washer 100 which, attached to the flange 31, has an axial column 101 by means of which it is engaged on the outer periphery of the hub 21, the flange 31 also being in contact, by means of its inner periphery, with a cylindrical bearing 93 on the hub 10.

Figure 27:
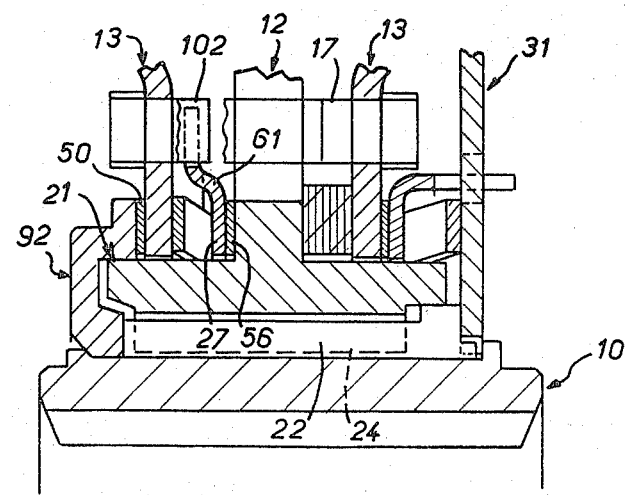

In the alternative embodiment illustrated in FIG. 27, the lug 61 of the bearing washer 27 is engaged, by means of a notch, on a stud 102 attached to the corresponding guide washer 13, between two of the spacers 17 connecting this guide washer 13 to the other.

Figure 28:
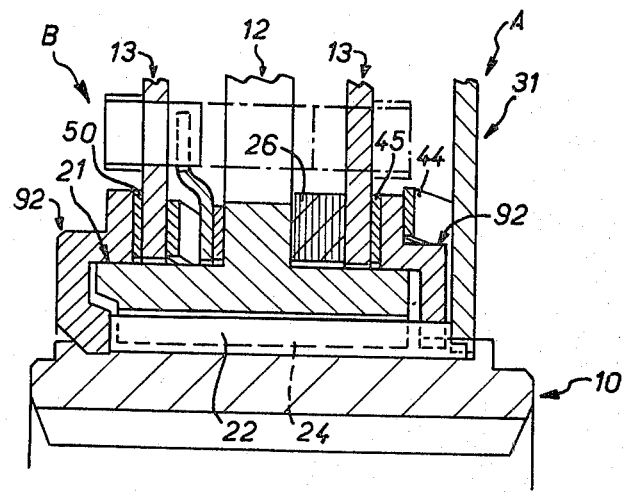

In the alternative embodiment illustrated in FIG. 28, each of the centering rings 92 carries a friction washer 45, 50 in contact with a corresponding guide washer 13, and that centering ring 92 which is located on the side of the flange 31 is blocked against rotation on the hub 10, this centering ring 92 having for this purpose, on its inner periphery, a toothing by means of which it is engaged, with axial sliding but without a radial play, on the splines 22 of the hub 10, to ensure the required centering.

As will be noted, in this alternative, the friction means associated with the first damping stage A, which in this case are the two friction washers 45, 50, take effect axially both on a first axial side of the coaxial part of the second damping stage B, on which they act, and on the other axial side of this coaxial part.

In other words, the friction washers 50 take effect on the opposite faces of the guide washers 13.

The advantageous result of this is that the hysteresis belonging to the friction means associated with the first damping stage A is independent of the possible wear of the friction means associated with the second damping stage B.

Figure 29:
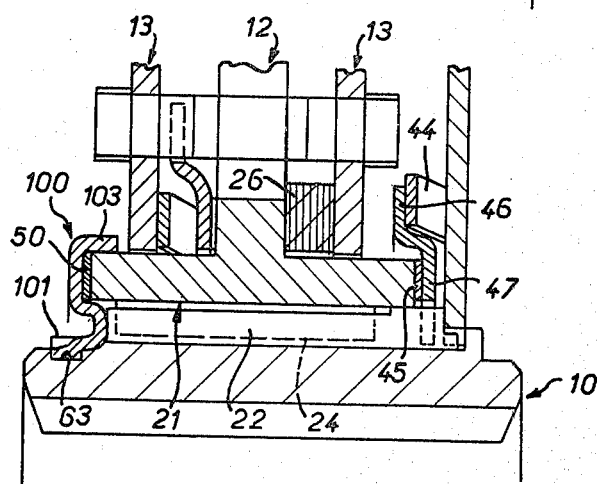

In the alternative embodiment illustrated in FIG. 29, the centering ring used at one of the axial ends of the hubs 10 and 21 is formed by a washer 100 which has axially, on its inner periphery, in a first direction, a collar 101 by means of which it is engaged on the outer periphery of the hub 10 and is maintained there axially as a result of being forced back radially at various points into a channel 63 of this hub 10, and which has axially, on its outer periphery, in a second direction opposite to the preceding direction, a collar 103 by means of which it is engaged on the outer periphery of the hub 21.

Figure 30:
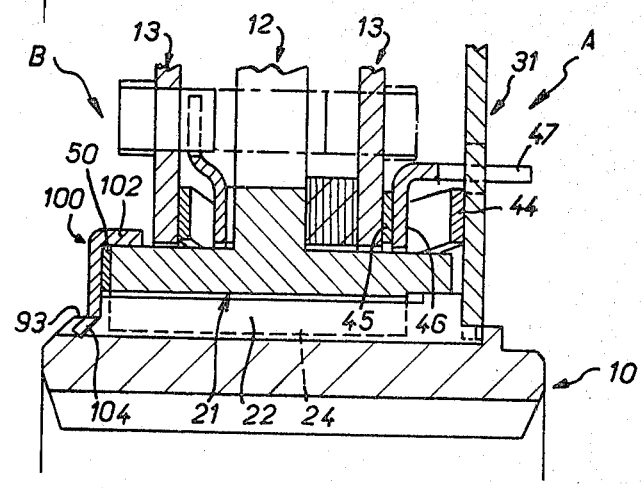

Alternatively, in FIG. 30, this ring 100 is engaged directly by means of its inner periphery on a cylindrical bearing 93 of the hub 10, and, to ensure that it is held axially, it has, on this inner periphery, lugs 104 which, extending obliquely, are engaged elastically on the hub 10 between the splines 22 of the latter and which are anchored in the bottom of the ribs delimited by these splines.

Figure 31:
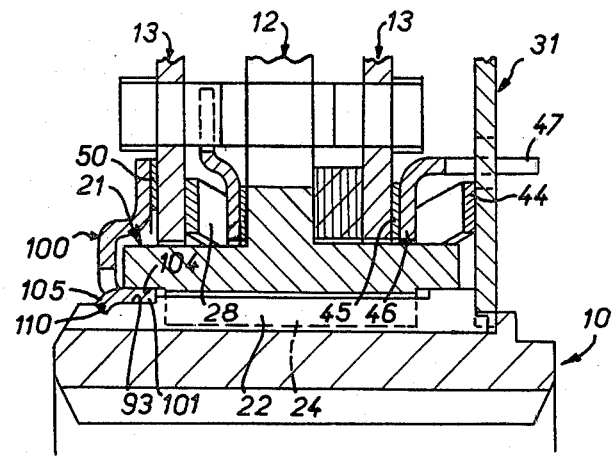

According to the embodiment illustrated in FIG. 31, the axial collar 101 of the centering ring 100 interacts both with a cylindrical bearing 93 of the hub 10 by means of its outer periphery and with a cylindrical bearing 104 of the hub 21 by means of its inner periphery; moreover, to ensure that it is held axially, it has from place to place, via slits, lugs 105 which are forced back into a channel 110 of the hub 10; finally, it carries a friction washer 50 in contact with the corresponding guide washer 13.

Figure 32:
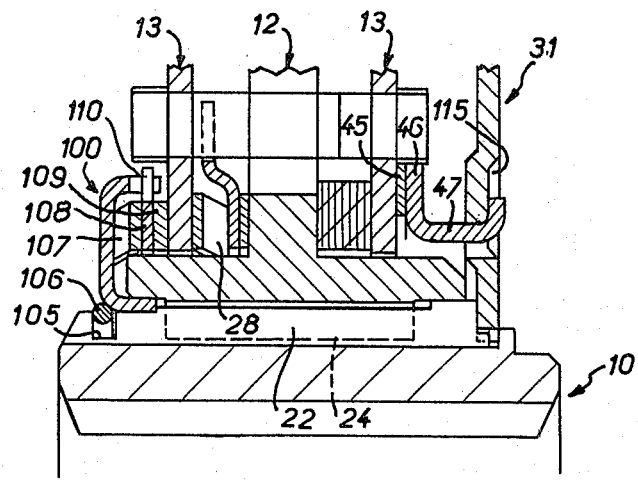

In the alternative embodiment illustrated in FIG. 32, the axial retention of such a centering ring 100 is effected by means of an elastic ring 106 located for this purpose in the channel 105 of the hub 10, and this centering ring 100 serves as an axial support for an axially acting elastic washer 107 of the "ONDUFLEX" type, which stresses, in the direction of the corresponding guide washer 13, a bearing washer 108 carrying in contact with this guide washer 13 a friction washer 109, the bearing washer 108 being blocked against rotation on the centering ring 100 by at least one axial lug 110 engaged for this purpose in a notch of the centering ring 100.

Moreover, in this alternative embodiment, each lug 47 of the bearing washer 46 is folded back at right angles into contact with the flange 31, after bearing axially on this flange 31 and passing through the latter, by means of a local pressed portion 115 of this flange; the axially acting elastic washer 44 which acts, in this case, on the friction washer 45 is the washer 107 located on the other side of the damping stage B.

Thus, as before, there are associated with the first damping stage A friction means which act axially in opposite directions on the part of the second damping stage B which is formed by the guide washers 13 and the friction disc carried by the latter.

Figure 33:
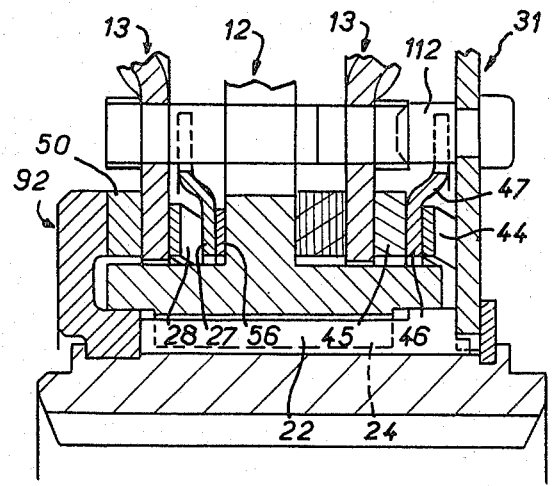

The same is true of the alternative embodiment illustrated in FIG. 33, in which, as regards one of the guide washers 13, a centering ring 92 carries directly in contact with the latter a friction washer 50, whilst, as regards the other guide washer 13, a bearing washer 46 carries directly in contact with the latter a friction washer 45, level with the friction washer 50.

Moreover, in this embodiment, the bearing washer 46 is blocked against rotation by a stud 112 attached axially for this purpose on the flange 31, each lug 47 extending axially and having a notch by means of which it is engaged on a stud 112.

The present invention is not limited to the embodiments described and illustrated, the diversity of which indicates the flexibility of application of the invention to embodiments conforming to different characteristics, but includes any practical alternatives and/or any combination of their various elements.

I claim:

1. A torsion damping device for a clutch plate assembly, said torsion damping device having an axis and comprising a common hub and separate first and second torsion damping stages, the first torsion damping stage comprising a relatively low stiffness torsion damping means and the second torsion damping stage comprising relatively high stiffness torsion damping means, said first and second torsion damping means being arranged axially adjacent each other on said common hub, each of said first and second torsion damping means comprising two coaxial parts mounted for relative angular movement and a plurality of elastic members interposed circumferentially between said coaxial parts and opposing relative angular movement thereof, said elastic members of said first damping stage being arranged in a first circumferential array about the axis of said torsion damping device and said elastic members of said second damping stage being arranged in a second circumferential array about the axis of said torsion damping device, the diameter of said first array being greater than that of said second array, one of said coaxial parts of said first damping stage being in the form of transvere flange fixed for rotation with said common hub and a plurality of pairs of separate part-annular guide plates respectively accommodating said elastic members, said pairs of guide plates being fixed for rotation with each other and with one of said coaxial parts of said second damping stage, the other of said coaxial parts of said second damping stage being in engagement with play with said common hub, said pairs of guide plates extending circumferentially to both ends of their associated elastic members, and axially outer guide plates defining with said common hub an axially outwardly opening annular recess.

2. A torsion damping device according to claim 1, wherein each of said guide plates has two radial shoulders for circumferentially supporting the ends of the associated elastic member, and means fixing said guide plates to said one coaxial part of said second damping stage and said radial shoulders being arranged substantially on a single circumference about the axis of said torsion damping device.

3. A torsion damping device according to claim 1, wherein one of said coaxial parts of said second damping stage comprises two identical guide washers, holes in one of said guide washers receiving means for fixing a friction disc thereto, identical holes in the other of said guide washers being utilized for receiving means for fixing said guide plates of said first damping stage to said other guide washer.

4. A torsion damping device according to claim 1, wherein said guide plates of said first damping stage axially adjacent said second damping stage are flush against the adjacent coaxial part of said second damping stage radially outwardly of said elastic members of said second damping stage.

5. A torsion damping device according to claim 1, wherein said flange of said first damping stage has a plurality of radial arms equal to the plurality of elastic members, each of said arms having fingers protruding into the ends of the associated elastic member.

6. A torsion damping device according to claim 1, wherein one of said coaxial parts of said second damping stage is carried by a second hub, said second hub being received coaxially around said common hub and centering means being provided between said hubs, said centering means comprising a centering ring interposed between said hubs at an axial end thereof.

7. A torsion damping device according to claim 6, wherein said centering ring cooperates with the inner periphery of one of said hubs and the other periphery of the other of said hubs.

8. A torsion damping device according to claim 1, wherein one of the coaxial parts of said second damping stage is carried by a second hub received coaxially around said common hub, centering means being provided between said hubs, said hubs being in loose spline relation with each other, said centering means comprising complementary cylindrical bearings formed on the respective hubs, beyond their splines, at one axial end thereof.

9. A torsion damping device according to claim 8, wherein, said centering means are provided at both axial ends of said hubs.

10. A torsion damping device for a clutch plate assembly, the torsion damping device comprising two separate damping stages including a first stage comprising torsion damping means of relatively lower rigidity and a second stage comprising torsion damping means of relatively greater rigidity, the torsion damping means being arranged axially adjacent one another on a first and common hub, and each of said torsion damping means having two coaxial parts mounted for relative angular movement against the action of elastic members interposed circumferentially between them, one of the coaxial parts of said first damping stage comprising, transversely, a flange rotating integrally with said first hub, whilst the other of said coaxial parts of said first damping stage comprises transversely, on the respective sides of said flange, two guide elements rotationally integral with each other and with one of the coaxial parts of the second damping stage and the other of the coaxial parts of said second damping stage engaging said first hub with play, each of the guide elements of said first damping stage comprising a plurality of pairs of separate guide plates for the respective elastic members thereof, each of said guide plates extending circumferentially on one side of the associated elastic member and at least partially covering the same, one of the coaxial parts of the second damping stage being carried by a second hub, said second hub being engaged coaxially around said common hub and centering means being provided between said hubs, said centering means comprising a centering ring interposed between said hubs at one of the axial ends thereof and interacting with the outer periphery of each of said hubs.

11. A torsion damping device for a clutch plate assembly, the torsion damping device comprising two separate damping stages, including a first stage comprising torsion damping means of relatively lower rigidity and a second stage comprising torsion damping means of relatively greater rigidity, the torsion damping means being arranged axially adjacent each other on a first and common hub, and each of the said torsion damping means having two coaxial parts mounted for relative angular movement against the action of elastic members interposed circumferentially between them, one of said coaxial parts of said first damping stage comprising, transversely, a flange rotating integrally with said first hub whilst the other of said coaxial parts of said first damping stage comprises, transversely, on the respective sides of said flange two guide elements rotationally integral with each other and with one of said coaxial parts of said second damping stage, and the other of said coaxial parts of said second damping stage engaging said first hub with play, each of the guide elements of the first damping stage comprising a plurality of pairs of separate guide plates for the respective elastic members thereof, each of said guide plates extending circumferentially on one side of the associated elastic member and at least partially covering the same, said first damping stage having friction means acting between said flange of said first damping means and one of said coaxial parts of said second damping stage, and axially acting elastic means being associated with said friction means, said friction means being axially effective both on axial sides of said one coaxial part of said second damping stage.

12. A torsion damping according to claim 11, wherein the second damping stage has friction means acting between said two coaxial parts of said second damping stage, axially acting elastic means being associated with said friction means, said friction means of both of said damping stages being arranged on circumferences of the torsion damping device having substantially equal diameters.

13. A torsion damping device according to claim 1, wherein said annular recess is axially inwardly limited by said flange of said first damping stage.

14. A torsion damping device according to claim 1, wherein outer peripheries of said guide plates are generally in radial alignment with outer peripheries of said coaxial parts of said second damping stage.

15. A torsion damping device according to claim 3, wherein inner peripheries of said guide plates are generally in radial alignment with radially inner limits of portions of said coaxial parts of said second damping stage accommodating said elastic members of said second damping stage.

* * * * *